(12) United States Patent
Landvik

(10) Patent No.: US 6,866,915 B2
(45) Date of Patent: Mar. 15, 2005

(54) CUSHION

(75) Inventor: Dag Landvik, Saltsjo Boo (SE)

(73) Assignee: Tempur World, LLC, Lexington, KY (US)

( * ) Notice: Subject to any disclaimer, the term of this patent is extended or adjusted under 35 U.S.C. 154(b) by 0 days.

(21) Appl. No.: 10/379,889

(22) Filed: Mar. 5, 2003

(65) Prior Publication Data

US 2003/0162000 A1 Aug. 28, 2003

Related U.S. Application Data

(63) Continuation-in-part of application No. 09/758,018, filed on Jan. 10, 2001, now Pat. No. 6,602,579.

(51) Int. Cl.$^7$ .............................. B32B 3/12; A47C 20/02
(52) U.S. Cl. ...................... 428/158; 428/160; 428/166; 428/172; 428/215; 428/218; 428/309.9; 428/316.6; 5/655.9; 5/740
(58) Field of Search ................................. 428/156, 158, 428/161, 163, 166, 172, 304.4, 316.4, 217, 218, 316.6, 309.9; 5/654, 655.9, 731, 740

(56) References Cited

U.S. PATENT DOCUMENTS

| | | |
|---|---|---|
| 3,000,020 A | 9/1961 | Lombard et al. |
| 3,047,888 A | 8/1962 | Shecter et al. |
| 3,833,259 A | 9/1974 | Pershing |
| 3,906,137 A | 9/1975 | Bauer |
| 3,939,508 A | 2/1976 | Hall et al. |
| 4,086,675 A | 5/1978 | Talbert et al. |
| 4,190,697 A | 2/1980 | Ahrens |
| 4,379,856 A | 4/1983 | Samaritter et al. |
| 4,580,301 A | 4/1986 | Ludman et al. |
| 4,755,411 A | 7/1988 | Wing et al. |
| 4,808,469 A | 2/1989 | Hiles |
| 4,840,430 A | 6/1989 | Shimada |
| 4,843,662 A | 7/1989 | Handelman |
| 5,031,261 A | 7/1991 | Fenner, Sr. |
| 5,189,747 A | 3/1993 | Mundy et al. |
| 5,230,947 A | 7/1993 | Ou |
| 5,294,181 A | 3/1994 | Rose et al. |
| 5,522,106 A | 6/1996 | Harrison et al. |
| 5,855,415 A | 1/1999 | Lilley, Jr. |
| 6,115,861 A | 9/2000 | Reeder et al. |
| 6,159,574 A | 12/2000 | Landvik et al. |
| 6,202,239 B1 | 3/2001 | Ward et al. |
| 6,237,173 B1 | 5/2001 | Schlichter et al. |

FOREIGN PATENT DOCUMENTS

| | | |
|---|---|---|
| DE | 1654301 | 3/1971 |
| DE | 3321720 | 12/1984 |
| FR | 2598910 | 11/1987 |
| IT | 1238272 | 7/1993 |
| IT | 00224783 | 6/1996 |
| JP | 62-183790 | 8/1987 |
| JP | 3128006 | 5/1991 |

Primary Examiner—Donald J. Loney
(74) Attorney, Agent, or Firm—Michael Best & Friedrich LLP

(57) ABSTRACT

A support cushion including a first underlying layer made from a flexible foam, at least one side of the first underlying layer being configured with a non-plane surface. The support cushion also includes a second underlying layer made from a flexible foam, at least one side of the second underlying layer being configured with a non-plane surface. The second underlying layer is placed in abutment with the first underlying layer. The support cushion further includes an overlying layer placed in abutment with the second underlying layer, the overlying layer being made from a visco-elastic foam.

36 Claims, 6 Drawing Sheets

CUSHION

RELATED APPLICATIONS

This application is a continuation-in-part of U.S. patent application Ser. No. 09/758,018 filed on Jan. 10, 2001 now U.S. Pat. No. 6,602,579, the entire contents of which is incorporated herein by reference.

FIELD OF THE INVENTION

This invention relates generally to cushions, and more particularly to cushions including bed mattresses, seat cushions, back rest cushions, or any other cushion for supporting a body in part or its entirety.

BACKGROUND OF THE INVENTION

A typical cushion uses elastic foam material for suitably distributing pressure from the body over a relatively large surface area of the body being supported by the cushion, such as a person lying on a mattress, a person seated in a couch, or an animal resting on a veterinary surgeon's table.

When used in combination with some type of less elastic overlying layer, the elastic foam underlying layer in the cushion counteracts the deepest depressed parts in the overlying layer in order to provide an increased counter-pressure against the body. To achieve a reasonably limited cushion thickness, the underlying layer is typically arranged in the form of a highly-elastic foam layer or a spring base with mechanical springs to provide suitable support to the user.

SUMMARY OF THE INVENTION

The present invention provides a support cushion including a first underlying layer made from a flexible foam, at least one side of the first underlying layer being configured with a non-plane surface. The support cushion also includes a second underlying layer made from a flexible foam, at least one side of the second underlying layer being configured with a non-plane surface, the second underlying layer being placed in abutment with the first underlying layer. Further, the support cushion includes an overlying layer placed in abutment with the second underlying layer, the overlying layer being made from a visco-elastic foam.

By the present invention it has been realized that the non-plane surface on such a flexible foam element constitutes an ideal underlying layer for an overlying layer of the visco-elastic foam, in that such an underlying layer with a non-plane surface of truncated cones, among other shapes, are able to display an ideal spring characteristic in supporting the overlying layer, which in itself distributes and smoothes out the direct counter-pressure from tops of the non-plane surface.

Further, it has been realized by the present invention that dual flexible foam elements serving as underlying layers to an overlying layer of visco-elastic foam provides additional benefits in supporting the overlying layer. Such benefits, among others, include providing a more consistent firmness over the cushion's useful life.

Additional features and advantages of the present invention will become apparent to those skilled in the art upon review of the following detailed description, claims and drawings.

BRIEF DESCRIPTION OF THE DRAWINGS

In the drawings, wherein like reference numerals indicate like parts.

Figure 1:
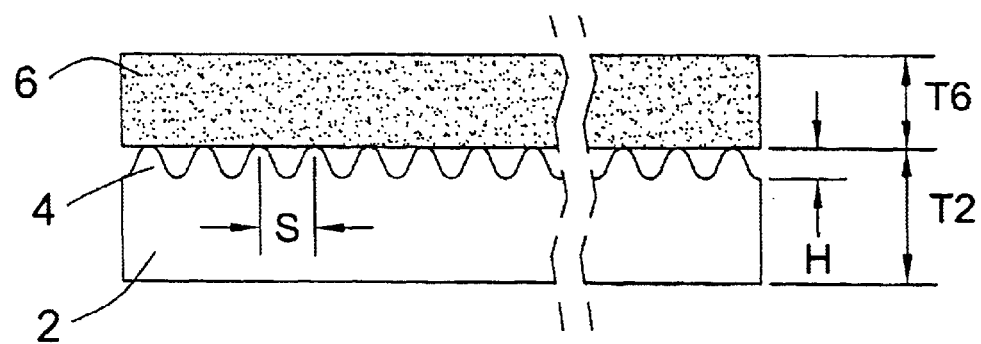
FIG. 1 illustrates a sectional view of a one construction of a cushion according to the present invention.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limited.

DETAILED DESCRIPTION

Visco-elastic foam assumes the form-in a somewhat "reluctant" manner—of the shape of the body being supported by the visco-elastic foam. After assuming the form of the body, the visco-elastic foam returns in a correspondingly "reluctant" manner to its original form when the pressure from the body is removed. A general definition of a visco-elastic foam may be ascertained from the following scenario: A rigid object, such as a steel ball, is dropped vertically downwards from a height of 1 m onto a plane surface of the visco-elastic foam resulting in an upward rebound of the rigid object of less than 10%, i.e., a rebound of less than 10 cm upwards from the plane surface of the visco-elastic foam.

The visco-elastic foam thus exercises only a modest elastic counter-pressure against that surface by which it is loaded, and for precisely this reason it will therefore allow the body to sink relatively deeply into the cushion in such a manner to distribute its overall counter-pressure over a large area of the body, with a relatively uniform and relatively low counter-pressure per unit area of the supported area of the body.

When utilized in cushions, the visco-elastic foam is intended especially to alleviate or counteract sores such as bedsores (decubitus) obtained from high-pressure points when lying on a mattress for long periods of time. Such high-pressure points may be generated by the highly-elastic foam layer or the spring base with mechanical springs supporting the weight of the body. Thus, it is desirable to limit the poor pressure distribution of the highly-elastic foam utilized in a typical cushion.

Figure 2:
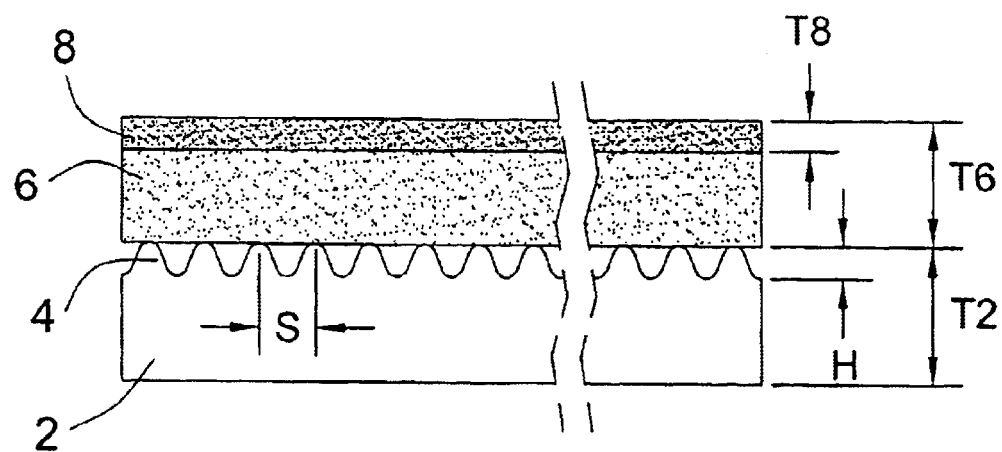
FIG. 2 illustrates a sectional view of another construction of the cushion according to the present invention.

The cushions shown in FIGS. 1–2 are both illustrated with an underlying layer 2, which consists of a highly-elastic polyurethane foam configured with a non-plane surface pattern of upright truncated cones 4. Other patterns may be used such as ribs extending in any chosen direction or a combination of cone-like patterns and rib-like patterns. Still other surfaces may be bulges having an oval or a rectangular shape or bulges having any other separately designed and chosen shape.

The underlying layer 2 may have a thickness T2, which includes the height H of the cones 4, of e.g., between about 50–150 mm. However, in some constructions of the underlying layer 2, the height T2 is between about 110–120 mm. Further, in yet other constructions of the underlying layer 2, the height T2 is between about 70–80 mm. Also, in some constructions of the cones 4, the height H is between about 15–30 mm. In other constructions of the cones 4, the height H is between about 20–25 mm. The cones 4 may also have a mutual spacing S of e.g., 30–70 mm, but more preferably about 50 mm. The cones 4 can be formed by a known technique by which a plane splitting of a foam block is carried out with the opposing outer sides compressed in a corresponding pattern.

In the constructions illustrated in FIGS. 1–2, only one side of the underlying layer 2 is construed with the truncated cones 4. Alternatively, it is possible to have both sides of the underlying layer 2 construed with truncated cones 4. Also, the mutual spacing S between the truncated cones 4 may vary so that the mutual spacing S between the truncated cones 4 is different along one part of the underlying layer 2 as compared to other parts of the underlying layer 2. This may be especially advantageous if the cushion is to support bodies exerting different pressures at different locations on the cushion. Accordingly, there may be parts of the underlying layer 2 not having any truncated cones 4 at all and thus being plane. Finally, the height H of the truncated cones 4 may vary along the underlying layer 2 so that parts of the underlying layer 2 are construed with cones 4 with one height and other parts of the underlying layer 2 being construed with cones 4 of another height.

An overlying layer 6 having a thickness T6 of e.g., between about 50–90 mm, but more preferably about 70 mm, is placed above the underlying layer 2 with a lower surface of the overlying layer 6 resting on the tops of the cones 4. Preferably, the overlying layer 6 is fastened to the cones 4 by fusing, or gluing together or any other suitable mutual mechanical bonding between the overlying layer 6 and the cones 4. The overlying layer 6 is made of a visco-elastic foam material with suitable density and hardness, such as the material marketed under the name Tempur®.

As shown in FIG. 2, a top layer 8 is placed onto the overlying layer 6 and preferably bonded to the overlying layer 6. The top layer 8 has a thickness T8 smaller than the thickness T6 of the overlying layer 6. The top layer thickness T8 is between about 15–35 mm. However, in some constructions of the top layer 8, the top layer thickness T8 is about 20 mm, while in other constructions of the top layer 8, the top layer thickness T8 is about 30 mm. Like the overlying layer 6, the top layer 8 is also made of a visco-elastic material such as the material marketed under the name Tempur®. However, the top layer 8 is more preferably made of a softer visco-elastic material than that of the overlying layer 6. Thus, the overall thickness of the cushion illustrated in FIG. 2 is between about 120–280 mm, but most preferably about 210 mm.

The terms, "underlying layer," "overlying layer," and "top layer" are meant to describe the position of the individual layers 2, 6, 8 in relation to each other. Thus, the terms are not to be construed as the underlying layer 2 being a layer, relative to an upward and downward orientation, lying beneath the overlying layer 6. It is meant as a layer lying on the farthest side of the cushion in relation to the body of the user. Similarly, the top layer 8, if a top layer is provided, is a layer lying on the nearest side of the cushion in relation to the body of the user. If the cushion, for example, is mounted on a back rest, then the underlying layer, the overlying layer and the top layer, if provided, will be orientated sideways and not downwards and upwards, respectively.

Also, the term body should not be construed as only the whole body of the user. The body may be any part of the body such as a head if the cushion is used as a pillow, the buttocks if the cushion is used as a seat, or the back if the cushion is used as a back rest. However, the cushion may also support the whole body if the cushion is used as a mattress.

Furthermore, in the constructions shown in FIGS. 1–2, the overlying layer 6 is in abutment with the underlying layer 2 along a side of the underlying layer 2 being construed with the truncated cones 4, the truncated cones 4 thus being directed toward the overlying layer 6. Alternatively, the overlying layer 6 could be in abutment with the side of the underlying layer 2 not being construed with the truncated cones 4, the truncated cones 4 thus being directed away from the overlying layer 6 and toward a firm support such as the bottom of a bed if the cushion is a mattress, or the back rest of a chair if the cushion is used as a back rest.

The hardness of the highly elastic underlying layer 2 should be between about 100–2000 N, measured in accordance with ISO 2439, and the density should typically be between about 30–40 kg/m$^3$. The visco-elastic layers, i.e., the overlying layer 6 and the top layer 8, have a density between about 50–100 kg/m$^3$, more preferably about 85 kg/m$^3$, and a hardness of between about 60–100 N, more preferably between about 70–85 N, with the top layer 8 being somewhat softer than the overlying layer 6.

FIGS. 3–6 are graphic representations showing test results from a test made according to ISO 2439 (Method B), where a sample of foam material is subjected to a load from a circular piston. The circular piston has a plane end surface and the relation between the load from the piston and the corresponding strain is measured. The test involves three initial compressions to a strain of 70% of the initial height of the sample. The three initial compressions are intended for obtaining a representative sample, in which the sample has been subjected to a number of compressions before the actual tests are made. Thereby the sample is preloaded, which primarily has the effect that any crushing of a number of foam cells is established before the actual test is performed.

As can be seen in all of the graphic representations the first initial compressions are the highest lying of the curves. This is due to the fact that a number of foam cells are not yet crushed, which makes the foam "harder" and more "brittle," i.e., a higher load is necessary for obtaining a certain strain. The subsequent second and third initial compressions are the curves lying below the first mentioned curve. This is due to the fact that most of the number of foam cells have been crushed during the first initial compression and just a few foam cells are being crushed during the subsequent initial compressions.

Thus, the highest lying three curves are the three initial compressions when applying the load to the sample. When relieving the load, the relation between the load and the strain is illustrated by the lowest lying curves decreasing along a substantially vertical part of the curve from 70% strain at maximum load and flattening out to a substantially horizontal part of the curve towards 0% strain at a load of 0

N. The difference between the relation between load and strain when applying the load and when relieving the load is due to hysteresis in the foam material.

After the three initial compressions have been carried out, the sample is now mechanically stable and may now be subjected to the actual compression test. The actual test is the curve having the discontinuities where the load is decreasing at a certain strain. The discontinuity is due to the test procedure where a load is applied by pushing the piston first to a strain of 25% during which the strain is maintained for a period of 30 seconds. During the maintenance of the strain, the load necessary for maintaining the strain is decreasing which is illustrated as a decrease of the load in relation to the actual strain of 25%. The same procedure is used at a strain of 40% and at a strain of 65%. The reason for the load decreasing is the actual elastic behavior of the foam, where both the highly elastic and the visco-elastic foam exhibit a viscous behavior. In the following, the four samples will be described in the table below and the actual compression test, not the initial compressions, will be discussed.

Figure 3:
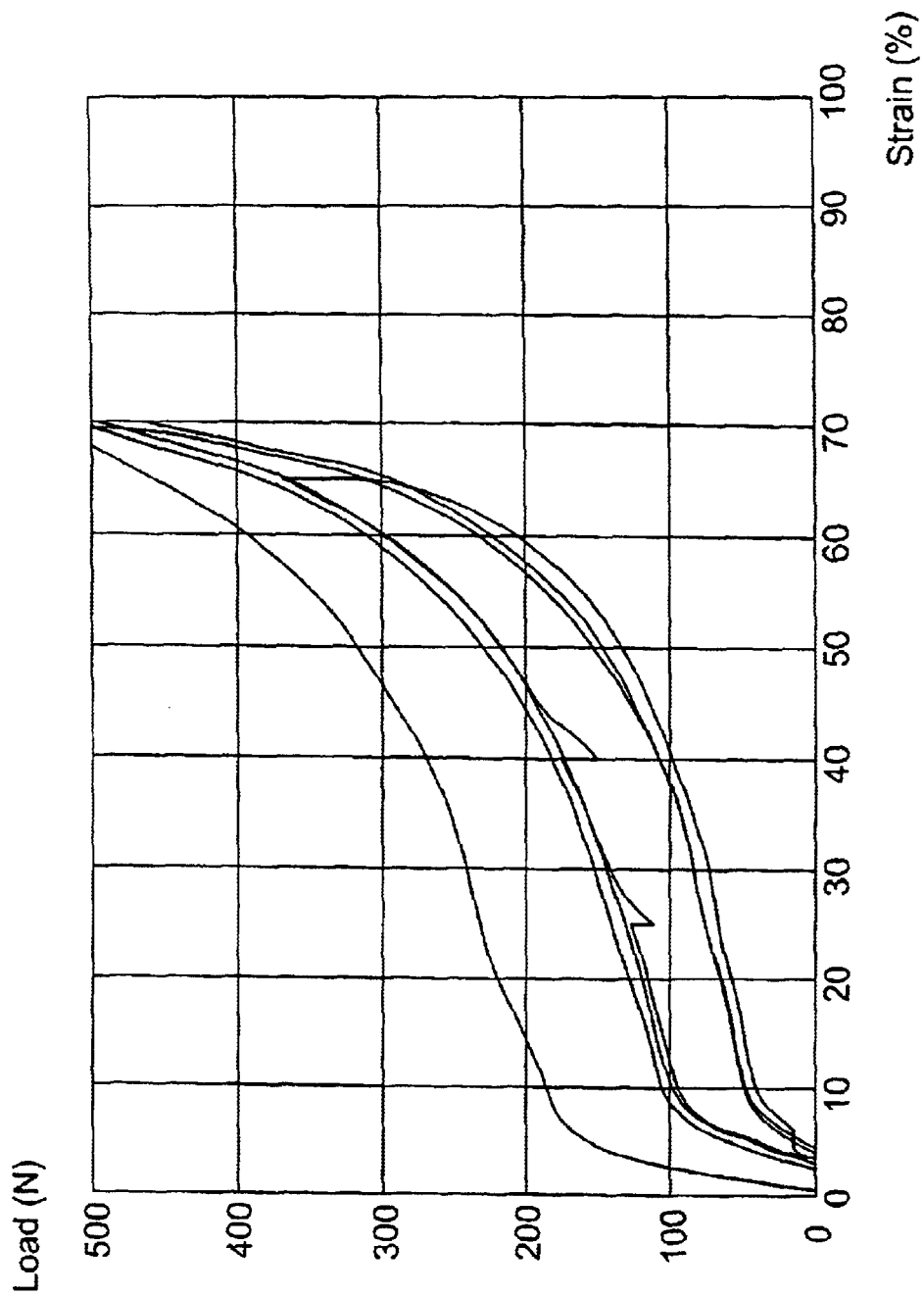
FIG. 3 is a graphical representation showing a relationship between applied load and resultant strain of highly elastic polyurethane foam.

| Batch reference & Sample reference | Initial height (mm) | 25% strain (N) | 40% strain (N) | 65% strain (N) |
| --- | --- | --- | --- | --- |
| FIG. 3: HE35N Mattress with plane surface | 50.8 | 112.4 | 152.3 | 308.5 |
| FIG. 4: T85-13 Mattress with plane surface | 50.6 | 58.0 | 76.6 | 141.2 |
| FIG. 5: HE35N + T85-13 Mattress with plane interface | 151.0 | 102.7 | 177.3 | 374.3 |
| FIG. 6: HE35N + 85-13 Mattress with non-plane interface | 146.0 | 77.2 | 132.6 | 290.2 |

FIG. 3 shows the relation between load and strain for commonly known highly elastic foam. Initially, the load applied is high in relation to the strain obtained. At a strain of about 8% the relation between the load and the strain decreases. At a strain of about 50% the relation between the load and the strain increases. Accordingly, there is a very uneven relation between the load and the strain during compression up to 65% strain, however the load carried being very high in relation to the strain caused by the load.

Figure 4:
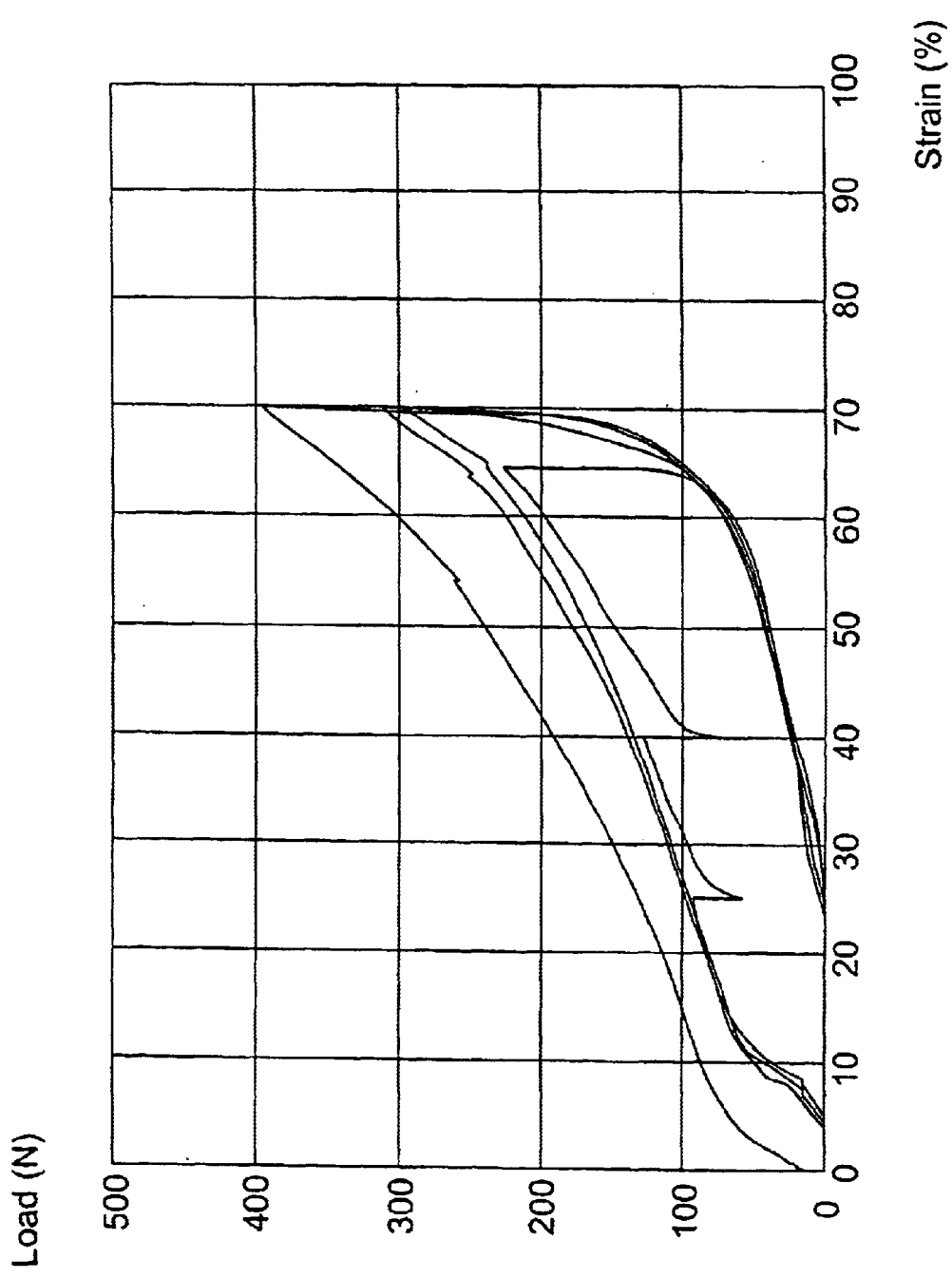
FIG. 4 is a graphical representation showing a relationship between applied load and resultant strain of a visco-elastic foam.

FIG. 4 shows the relation between load and strain for known visco-elastic foam. Initially, the load applied is high, but limited, in relation to the strain obtained. At a strain of about 8% the relation between the load and the strain decreases. The relation between the strain and the load is substantially the same up to the strain of 65%. Accordingly, there is a much more even relation between the load and the strain during compression up to 65% strain, however the load carried being very limited in relation to the strain caused by the load.

Figure 5:
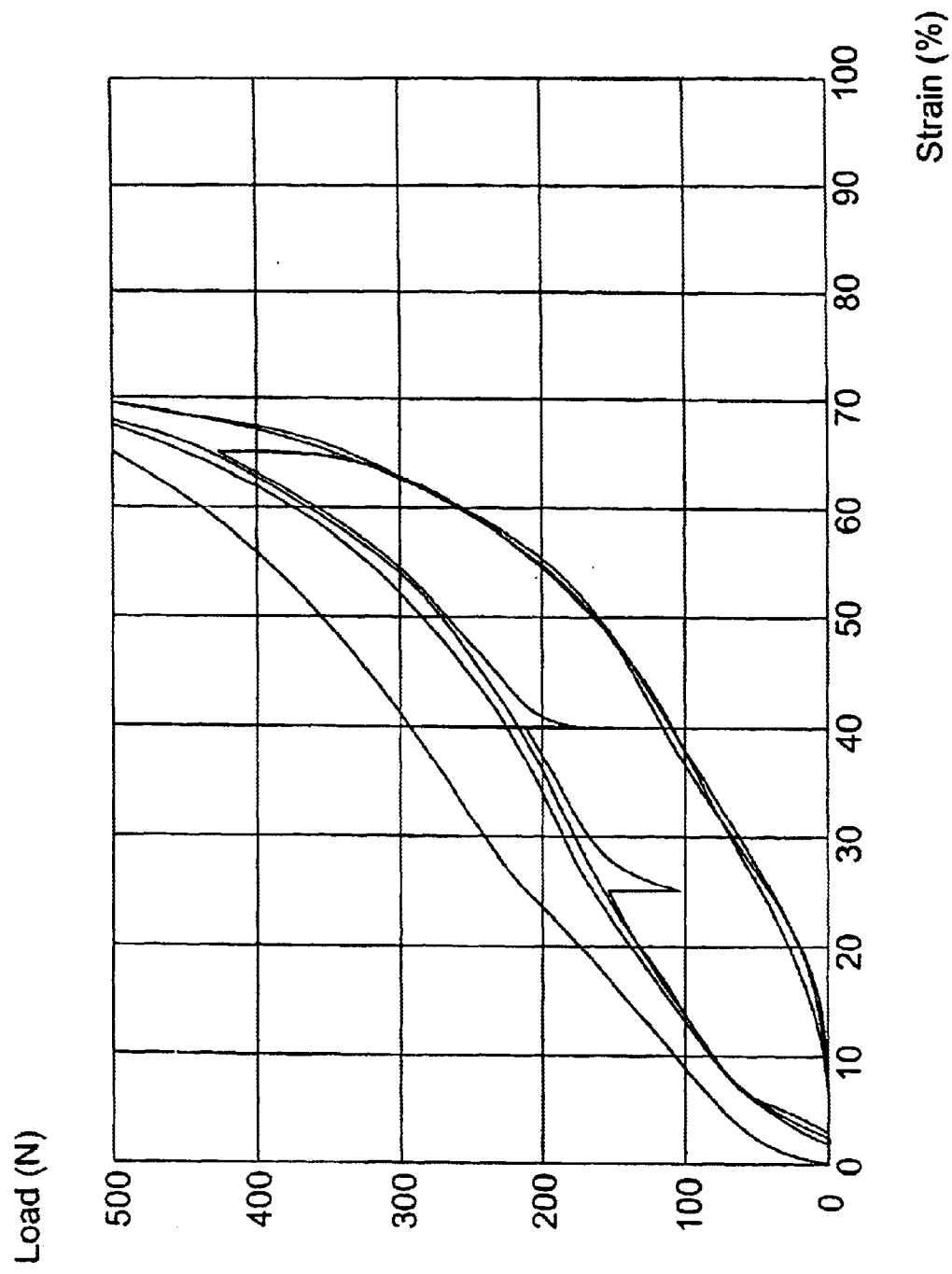
FIG. 5 is a graphical representation showing a relationship between applied load and resultant strain of a combination of highly elastic polyurethane foam and visco-elastic foam.

FIG. 5 shows the relation between load and strain for a combination of common highly elastic foam and a known visco-elastic foam, where the interface between the foams is established between a plane upper surface of the highly elastic foam and a planer lower surface of the visco-elastic foam. The total thickness of the mattress is 151.0 mm, where the thickness of the highly elastic foam is about 80 mm and the thickness of the visco-elastic foam is about 70 mm. The difference between the individual thicknesses and the total thickness is established during the mutual bonding of the two layers of foam, where fusing together the two layers may cause the interface to create the difference.

Initially, the load applied is high, but somewhat limited, in relation to the strain obtained. At a strain of about 4% the relation between the load and the strain decreases. At a strain of about 50% the relation between the load and the strain increases. Accordingly, there is still a somewhat uneven relation between the strain and the load during a compression up to 65% strain, however the load carried being relatively high due to the highly elastic foam and the relation being somewhat more even due to the visco-elastic foam.

Figure 6:
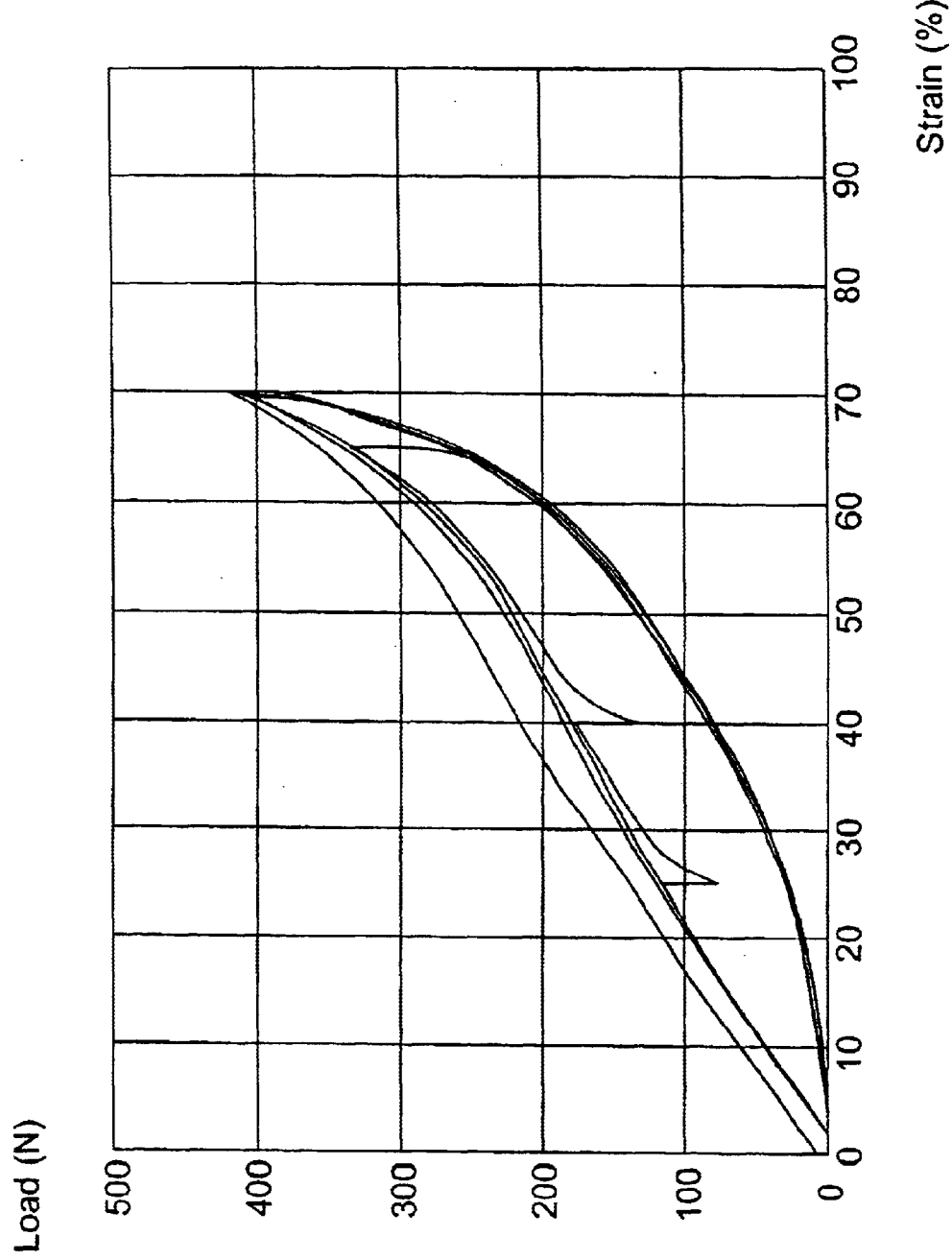
FIG. 6 is a graphical representation showing a relationship between applied load and resultant strain of a combination of highly elastic polyurethane foam having a non-plane surface and visco-elastic foam.

FIG. 6 shows the relation between load and strain for a combination of highly elastic foam having a non-plane surface and a known visco-elastic foam, where the interface between the foams thus is non-plane. The surface of the highly elastic foam is provided with a cone-like surface. The total thickness of the mattress is 146.0 mm, where the thickness of the highly elastic foam still is about 80 mm and the thickness of the visco-elastic foam still is about 70 mm. The difference between the individual thickness and the total thickness is established during the mutual bonding of the two layers of foam, where tops of the cone-like surface are partly disintegrated when fusing the two layers together.

Both initially and during substantially the entire application of load the relation between the load and the strain is substantially linear. The relation between the load and the strain increases very little until after a strain of above 50% is obtained. Accordingly, there is a substantially linear relation between the load and the strain during the entire compression up to 65% strain due to the non-plane surface of the highly elastic surface and the consequently new interface between the highly elastic foam and the visco-elastic foam. Also, the load carried is relatively high due to the highly elastic foam and, as mentioned, the relation between the load and the strain is completely even due to the new combination of the non-plane surface of the highly elastic foam and the visco-elastic foam.

The invention has been described with reference to tests made to specific samples of highly elastic foam and of visco-elastic foam and two combinations of these. However, both the type of highly elastic foam and the type of visco-elastic foam, the dimensions of the foams and the combinations of the foams may be different, without departing from the scope of protection, where the highly elastic foam has an uneven surface, which preferably is the surface bonded to a surface of a visco-elastic foam. Only by combining the highly elastic foam having an uneven surface with the visco-elastic foam is it possible to obtain results as the ones shown in FIG. 6, i.e., a substantially linear relation between the load and the strain resulting in a substantial increase in user comfort for the user lying, sitting or resting against the cushion, but still maintaining a satisfactory high load carrying capacity.

Figure 7:
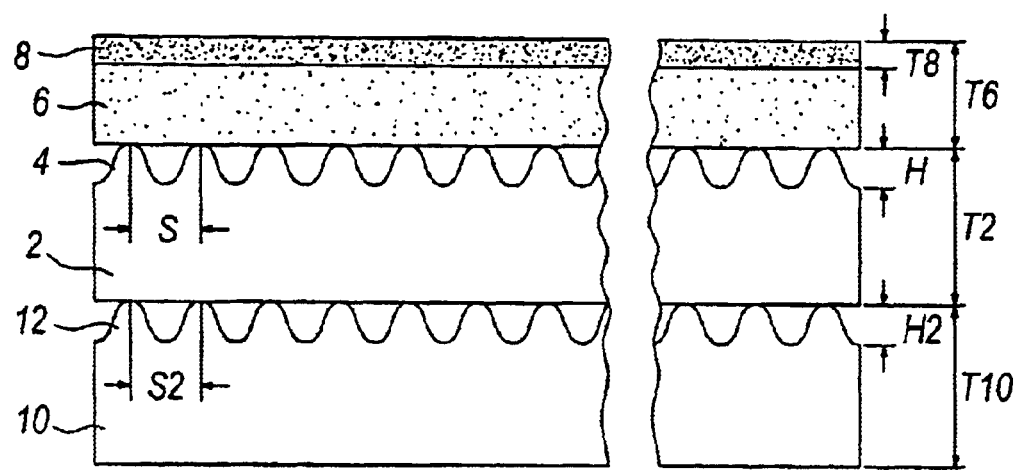
FIG. 7 illustrates a sectional view of yet another construction of the cushion according to the present invention.

Yet another construction of the cushion is illustrated in FIG. 7. In this construction, a second underlying layer 10 is used in combination with the cushion of FIG. 2. Like the first underlying layer 2, the second underlying layer 10 may have a thickness T10, which includes the height H2 of the cones 12, of e.g., between about 50–150 mm. However, in some constructions of the second underlying layer 10, the height T10 is between about 110–120 mm. Further, in yet other constructions of the second underlying layer 10, the height T10 is between about 70–80 mm. Also, in some constructions of the cones 12, the height H2 is between about 15–30 mm. In other constructions of the cones 12, the height H2 is between about 20–25 mm. The cones 12 may also have a mutual spacing S2 of e.g., 30–70 mm, but more preferably about 50 mm. Alternatively, in yet other constructions of the underlying layers 2, 10, the heights H, H2 of the cones 4, 12 may be different for each underlying layer 2, 10. Also, in other constructions of the underlying layers 2, 10, the spacings S, S2 of the cones 4, 12 may be different for each underlying layer 2, 10.

In the construction illustrated in FIG. 7, only one side of the second underlying layer 10 is construed with the truncated cones 12. Alternatively, it is possible to have both sides of the second underlying layer 10 construed with truncated cones 12. Also, the mutual spacing S2 between the truncated cones 12 may vary so that the mutual spacing S2 between the truncated cones 12 is different along one part of the second underlying layer 10 as compared to other parts of the second underlying layer 10. This may be especially advantageous if the cushion is to support bodies exerting different pressures at different locations on the cushion. Accordingly, there may be parts of the second underlying layer 10 not having any truncated cones 12 at all and thus being plane. Finally, the height H2 of the truncated cones 12 may vary along the second underlying layer 10 so that parts of the second underlying layer 10 are construed with cones 12 with one height and other parts of the second underlying layer 10 being construed with cones 12 of another height.

In the construction of FIG. 7, the cones 12 of the second underlying layer 10 are fastened to the planar side of the underlying layer 2 by fusing, gluing, or any other suitable mutual mechanical bonding between the underlying layers 2, 10. Thus, the overall thickness of the cushion of FIG. 7 is between about 210–370 mm, more preferably between about 220–280 mm, and most preferably about 250 mm.

A series of load-deflection tests were performed on both cushion constructions of FIG. 2 and FIG. 7 to determine the respective firmness of each cushion after repeated loading cycles. Initial load deflection measurements were obtained using a 13.5" circular platen prior to placing each cushion on a hexagonal roller machine, which performed the repeated loading cycles. During the tests, the hexagonal roller rolls across the width of each cushion for 100,000 cycles in accordance with ASTM standard F1566-99 part 7. After testing each cushion, final load deflection measurements were taken after approximately 1 hour of recovery time for each cushion. Firmness measurements were also taken in association with the load-deflection tests in accordance with ASTM standard F1566-99 part 6 "Firmness Rating"—center location. A contact force of 1 lb. was used for height measurements. The results of the load-deflection tests are shown in the following table, in which the cushion of FIG. 2 is labeled "Cushion A," and the cushion of FIG. 7 is labeled "Cushion B":

| | Load Deflections | | | | | |
|---|---|---|---|---|---|---|
| | Load (lbs)-Before Test | | Load (lbs)-After 100K cycles | | % Difference | |
| Deflection | Cushion A | Cushion B | Cushion A | Cushion B | Cushion A | Cushion B |
| 0.5" | 33.1 | 22.0 | 25.2 | 17.6 | −23.9% | −20.0% |
| 1.0" | 57.0 | 39.9 | 40.4 | 32.3 | −29.1% | −19.0% |
| 1.5" | 75.1 | 49.7 | 52.4 | 40.5 | −30.2% | −18.5% |
| 2.0" | 94.7 | 60.0 | 67.5 | 49.2 | −28.7% | −18.0% |
| 2.5" | 117.7 | 73.1 | 89.6 | 60.4 | −23.9% | −17.4% |
| 3.0" | 150.8 | 90.8 | 122.7 | 76.0 | −18.6% | −16.3% |
| Average | 88.1 | 55.9 | 66.3 | 46.0 | −24.7% | −17.7% |
| Height @ 1 lb | 8.23" | 10.39" | 8.19" | 10.30 | −0.04" | −0.09" |

To interpret the results shown in the above table, a negative % Difference value indicates that the cushion softened after 100,000 loading cycles, and a positive % Difference value indicates that the cushion hardened after 100,000 loading cycles. However, the closer this value is to 0% the better, since the consumer tends to expect the cushion to have the same relative "feel" 5 to 10 years into the future as it did initially. It is industry accepted that the % Difference value be under 25% in either direction (+ or −). Also, it is generally accepted in industry that 100,000 cycles of the hexagonal roller represents approximately 10 years of use. With reference to the above table, "Cushion B," exhibited an average −17.7% Difference value compared to "Cushion A," which exhibited an average −24.7% Difference value. Therefore, "Cushion B," which is the cushion construction including multiple underlying layers 2, 10 (illustrated in FIG. 7), is better able to maintain its "feel" after repeated loading cycles equivalent to 10 years of actual use.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

I claim:

1. A support cushion comprising:
   a first underlying layer made from a flexible foam, at least one side of the first underlying layer being configured with a non-plane surface;
   a second underlying layer made from a flexible foam, at least one side of the second underlying layer being configured with a non-plane surface, the second underlying layer being placed in abutment with the first underlying layer; and
   an overlying layer placed in abutment with the second underlying layer, the overlying layer being made from a visco-elastic foam;
   wherein the side of the first underlying layer configured with the non-plane surface is placed in abutment with a side of the second underlying layer configured with a plane surface.

2. The support cushion of claim 1, wherein the non-plane surface of at least one of the first and second underlying layers includes truncated cones.

3. The support cushion of claim 2, wherein the truncated cones have a height between about 15 mm and 30 mm.

4. The support cushion of claim 2, wherein the truncated cones have tops, such that a mutual spacing between about 30 mm and 70 mm exists between the tops of the truncated cones.

5. The support cushion of claim 1, wherein at least one of the first and second underlying layers includes at least one side having the non-plane surface configured in a continuous pattern.

6. The support cushion of claim 1, wherein the second underlying layer is joined together with the first underlying layer by fusing a side of the second underlying with a side of the first underlying layer.

7. The support cushion of claim 1, wherein the second underlying layer is joined together with the first underlying layer by gluing a side of the second underlying with a side of the first underlying layer.

8. The support cushion of claim 1, wherein the overlying layer is placed in abutment with the side of the second underlying layer configured with the non-plane surface.

9. The support cushion of claim 1, wherein the overlying layer is joined together with the second underlying layer by fusing a side of the overlying layer with a side of the second underlying layer.

10. The support cushion of claim 1, wherein the overlying layer is joined together with the second underlying layer by gluing a side of the overlying layer with a side of the second underlying layer.

11. The support cushion of claim 1, further comprising a top layer placed in abutment with the overlying layer, wherein the top layer is made from a visco-elastic foam.

12. The support cushion of claim 11, wherein the top layer has a thickness between about 15 mm and 35 mm.

13. The support cushion of claim 11, further comprising a total thickness of the first underlying layer, the second underlying layer, the overlying layer, and the top layer being between about 220 mm and 280 mm.

14. The support cushion of claim 13, wherein the total thickness is between about 240 mm and 260 mm.

15. The support cushion of claim 11, wherein the overlying layer and the top layer have substantially equal densities.

16. The support cushion of claim 11, wherein the density of each of the top layer and the overlying layer is between about 50 kg/m$^3$ and 100 kg/m$^3$.

17. The support cushion of claim 1, wherein the overlying layer has a hardness between about 60 N and 100 N.

18. The support cushion of claim 1, wherein the first and second underlying layers are made from a highly elastic polyurethane foam material.

19. The support cushion of claim 1, wherein at least one of the first and second underlying layers has a thickness between about 50 mm and 150 mm.

20. The support cushion of claim 19, wherein the thickness of at least one of the first and second underlying layers is between about 110 mm and 120 mm.

21. The support cushion of claim 19, wherein the thickness of at least one of the first and second underlying layers is between about 70 mm and 80 mm.

22. The support cushion of claim 1, wherein the overlying layer has a thickness between about 50 mm and 90 mm.

23. The support cushion of claim 22, wherein the thickness of the overlying layer is between about 65 mm and 75 mm.

24. The support cushion of claim 16, wherein the density of each of the top layer and the overlying layer is between about 80 kg/m$^3$ and 90 kg/m$^3$.

25. The support cushion of claim 11, wherein the overlying layer has a higher hardness than the top layer.

26. A support cushion comprising:
a first underlying layer made from a flexible foam, at least one side of the first underlying layer being configured with a non-plane surface;
a second underlying layer made from a flexible foam, at least one side of the second underlying layer being configured with a non-plane surface, the second underlying layer being placed in abutment with the first underlying layer; and
an overlying layer placed in abutment with the second underlying layer, the overlying layer being made from a visco-elastic foam;
wherein the non-plane surface of at least one of the first and second underlying layers includes truncated cones.

27. The support cushion of claim 26, wherein the truncated cones have a height between about 15 mm and 30 mm.

28. The support cushion of claim 26, wherein the truncated cones have tops, such that a mutual spacing between about 30 mm and 70 mm exists between the tops of the truncated cones.

29. A support cushion comprising:
a first underlying layer made from a flexible foam, at least one side of the first underlying layer being configured with a non-plane surface;
a second underlying layer made from a flexible foam, at least one side of the second underlying layer being configured with a non-plane surface, the second underlying layer being placed in abutment with the first underlying layer;
an overlying layer placed in abutment with the second underlying layer, the overlying layer being made from a visco-elastic foam; and
a top layer placed in abutment with the overlying layer, wherein the top layer is made from a visco-elastic foam.

30. The support cushion of claim 29, wherein the top layer has a thickness between about 15 mm and 35 mm.

31. The support cushion of claim 29, further comprising a total thickness of the first underlying layer, the second underlying layer, the overlying layer, and the top layer being between about 220 mm and 280 mm.

32. The support cushion of claim 31, wherein the total thickness is between about 240 mm and 260 mm.

33. The support cushion of claim 29, wherein the overlying layer and the top layer have substantially equal densities.

34. The support cushion of claim 29, wherein the density of each of the top layer and the overlying layer is between about 50 kg/m$^3$ and 100 kg/m$^3$.

35. The support cushion of claim 34, wherein the density of each of the top layer and the overlying layer is between about 80 kg/m$^3$ and 90 kg/m$^3$.

36. The support cushion of claim 29, wherein the overlying layer has a higher hardness than the top layer.

* * * * *